June 21, 1955 F. D. BARBER 2,711,353
LUBRICANT RESERVOIR FOR JOURNAL BEARING
Filed Sept. 18, 1951 2 Sheets-Sheet 1

INVENTOR.
Franklin D. Barber
BY
Harvey M. Gillespie
Atty.

June 21, 1955
F. D. BARBER
2,711,353
LUBRICANT RESERVOIR FOR JOURNAL BEARING
Filed Sept. 18, 1951
2 Sheets-Sheet 2
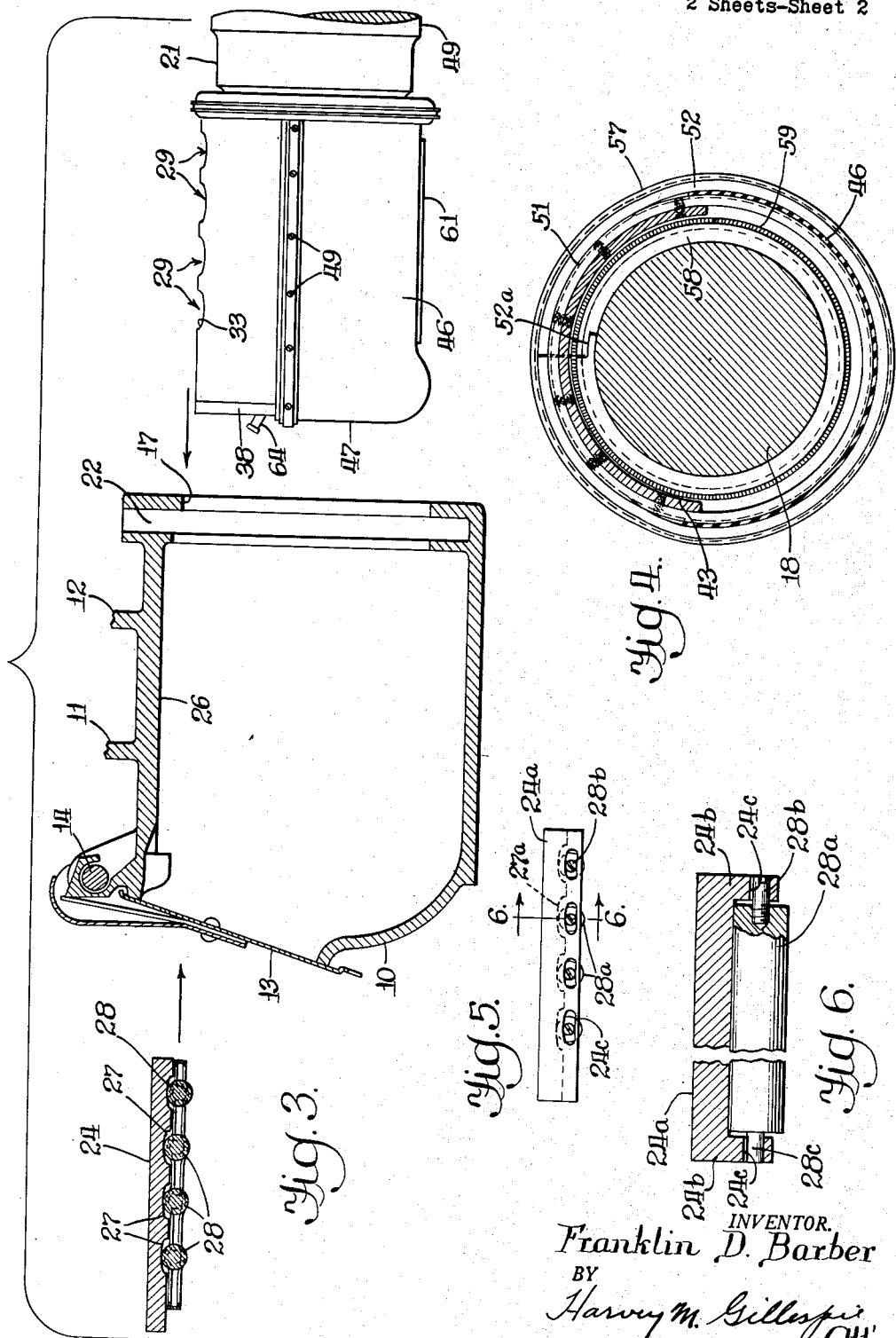
INVENTOR.
Franklin D. Barber
BY
Harvey M. Gillespie
Atty

United States Patent Office 2,711,353
Patented June 21, 1955

2,711,353

LUBRICANT RESERVOIR FOR JOURNAL BEARING

Franklin D. Barber, Flossmoor, Ill., assignor to Standard Car Truck Company, Chicago, Ill., a corporation of New Jersey Application September 18, 1951, Serial No. 247,130

4 Claims. (Cl. 308—85)

This invention relates generally to improvements in railway car journal lubrication and more particularly to means for continuously applying adequate lubricant, free from contamination, to an axle journal bearing of the car.

Railway car journal boxes, of conventional construction, include a wedge interposed between the upper inside surface of the journal box and a journal bearing or "brass," the latter of which is formed to seat and make bearing contact with the upper surface of the axle journal. Such journal boxes are usually provided with oil saturated absorbent material, so-called waste, which is arranged within the journal box so as to contact the under-side of the journal; the lubricant being carried from the oil saturated packing to the journal bearing by the rotation of the axle journal. While the old type of lubrication was accepted as suitable for slow moving traffic, the higher speeds now maintained for railway traffic require more reliable lubrication.

With the view of providing more satisfactory lubrication, it has been previously proposed to provide a lubricant reservoir which cooperates with a journal bearing, the said reservoir encompassing the lower portion of the journal and is provided with means engaging the journal to seal the reservoir against loss of lubricant and also prevent the entrance of foreign matter into the reservoir and bearing areas. However, under service conditions, the car body is subjected to lateral swaying movements, and these movements are transmitted through the journal box and associated devices to the journal bearing and, therefore, have a tendency to shift the journal bearing lengthwise of the axle journal. Such lengthwise shifting of the journal bearing naturally imparts a corresponding movement to the lubricant reservoir suspended from the journal bearing. Also the wheel and axle assemblies move back and forth transversely of the track and therefore impart axial movement of the journal relative to the journal bearing. It is these relative axial movements and their effects in connection with a sealed-in journal that the present invention is adapted to overcome, since any substantial axial movement of the sealed-in axle journal relative to the bearing and its associated reservoir sets up a so-called pumping action whereby moisture and foreign matter is carried by the journal into the reservoir and increased internal pressure within the reservoir tends to force lubricant out through the reservoir sealing means.

Accordingly, it is a specific object of the present invention to provide in connection with a sealed-in axle journal improved arrangements and constructions whereby the axle journal may move freely in the direction of its length without imparting relative lengthwise movement between itself and its associated bearing element. In this connection, the invention contemplates the provision of a lubricating means, of the reservoir type, which may be suspended from a journal bearing member so that the journal bearing and the reservoir embrace the axle journal and will move with the journal when the latter shifts transversely of a trackway in response to the operating conditions which produce such movements of the axle. The construction also includes the provision of roller elements which are interposed between the journal bearing and the journal box and thereby relieve the bearing element from the thrust of lateral sways of the car body. The roller elements are positioned to roll upon the journal bearing and thereby relieve the journal bearing from the thrusts incident to lateral movements of the car body and also permit the bearing element to move relative to the journal box in unison with the axle journal when the wheels and axle oscillate transversely of the trackway.

A further object of the invention includes the provision of lubricating means of the foregoing type which may be readily applied to a conventional railway car axle journal preliminary to insertion of the journal and journal bearing into the journal box and which otherwise include improvements which insure improved lubrication at minimum cost.

A still further object of this invention is the provision of improved lubricating means of the foregoing type which is more efficient, more economical and more reliable than lubricating means heretofore employed.

Other objects and advantages of the invention will become apparent from a study of the following description taken with the drawings. Said drawings illustrate a preferred embodiment of the invention and what is now considered to be the best mode of applying the principles thereof. Other embodiments of the invention as may fall within the purview and scope of the appended claims are intended to be reserved.

In the drawings Fig. 1 is a longitudinal, vertical cross-sectional view through a railway car journal box having embodied therein the improved journal lubricant reservoir according to the present invention;

Fig. 3 is an exploded view partly in section and partly in elevation showing the journal bearing and lubricant reservoir assembled on an axle journal in readiness to be inserted into the journal box;

Fig. 4 is a sectional view taken on line 4—4 of Fig. 1;

Fig. 5 is a view in side elevation of a bearing plate similar to the one shown in Fig. 3, but modified to support the roller elements; and Fig. 6 is a partial section taken on line 6—6 of Fig. 5.

Figure 1:
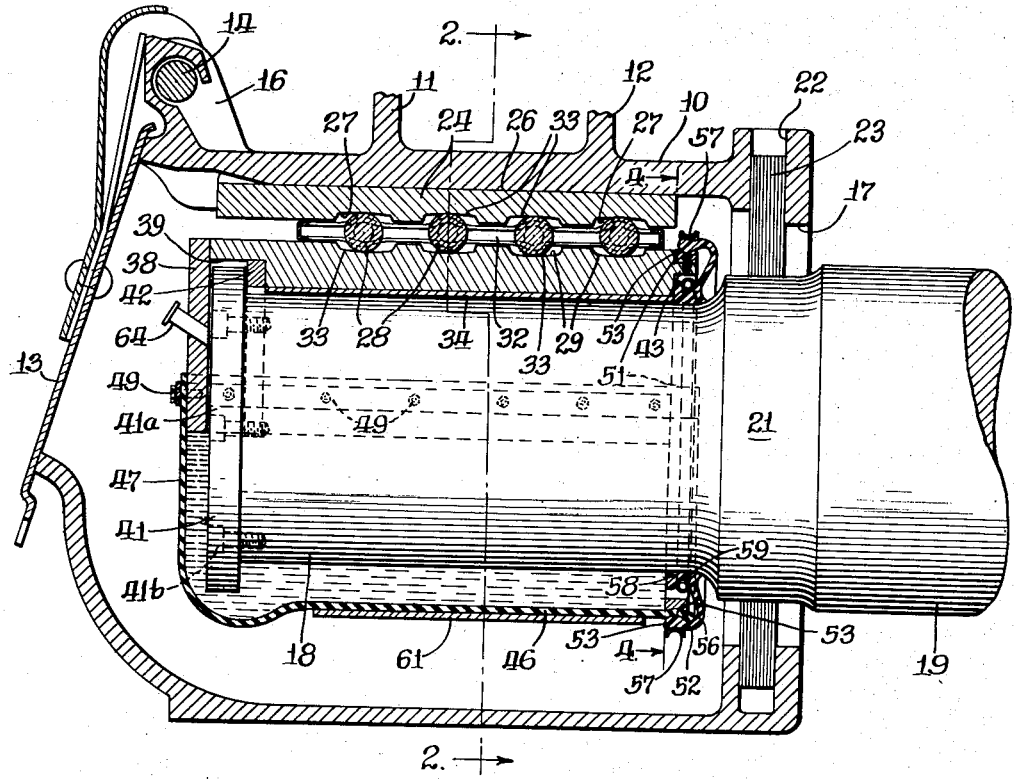

Referring first to Figs. 1 to 4, inclusive, of the drawings, my invention is illustrated as being housed within a journal box 10 of a railway car truck. The form of journal box illustrated is of conventional construction and has a truck side frame cast integrally therewith as indicated at 11 and 12. The journal box 10 is provided with an end opening which may be covered by a journal box closure member 13 pivotally supported on a pin 14 carried on lugs 16 integrally formed with the journal box 10.

At the opposite end, the journal box is provided with an opening 17 to receive an axle journal 18 of a conventional wheel axle 19. The axle 19 is provided with a dust guard bearing 21 disposed between the axle journal 18 and the axle body 19. The journal box 10, being of conventional design, is provided with a dust guard slot 22 which, as will be seen, is aligned with the dust guard bearing 21 and is adapted to receive a dust guard 23 of any suitable construction, the function of the dust guard being to prevent the ingress of dirt or other foreign materials inside of the journal box 10.

My invention is applicable to journal boxes and axle journals of such conventional construction and, in the embodiment illustrated, includes a bearing plate 24 underlying the top inside surface 26 of the journal box 10. The bearing plate 24 is provided on its underside with bearing surfaces or grooves 27 for cooperation with anti-friction rollers 28 resting on corresponding bearing surfaces or grooves 29 formed in the upper surface of a journal bearing member 31. The said bearing member 31 is of conventional block form comprising a unitary metal casting formed with a concave surface for seating on the top surface of the axle journal. The bearing block therefore serves in effect as a combination journal bearing and support of said anti-friction rollers 28. The rollers 28 are supported in a guide frame 32 extending axially of the axle 19 and functions to maintain the rollers 32 in parallel alignment in their respective bearing grooves. The rollers 28 are cylindrical and the bearing surfaces 27 and 29 are concaved and are formed with symmetrically gradually curving inclines 33. Thus, when the rollers 28 are caused to move laterally, as will be hereinafter described, the said rollers ride up on the gradually curving inclines 33, whereby the bearing plate 24 and the journal box 10 are caused to be elevated, thereby affording resistance to lateral movement of the car body. The rollers 28 also permit the journal bearing block to move with the journal when the latter reciprocates back and forth in the journal box in response to like shifting of the wheels and axle transversely of the trackway as the wheels roll along the trackway.

The journal bearing block 31 is provided with a journal bearing liner 34 of babbitt or other suitable bearing material resting on top of the axle journal 18. Depending from opposite sides of the member 31 are extensions 36, each being provided with a longitudinally extending groove 37. Suitably secured to the end face of the journal bearing block 31 is a plate 38 of hardened metal arranged to take the end thrust of the axle journal 18. The journal bearing block 31 is recessed as at 39 to accommodate an end collar 41 of the axle journal 18, the latter of which is preferably, though not necessarily, in the form of a cap 41ª removably secured to the journal by bolts 41ᵇ. Attached to the vertical wall of the recess 39 is a renewable metal thrust plate 42. The clearances provided between the journal collar 41 and the plates 38 and 42 are such that only a very limited axial movement of the journal bearing member 31 relative to the axle journal 18 is permitted. The rearward face of the journal bearing member 31 is provided with a shoulder 43 which substantially follows the contour of the bearing liner 34.

Figure 2:
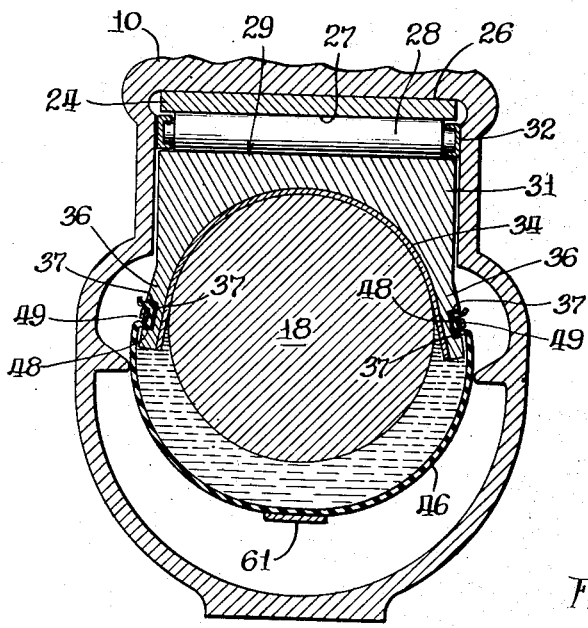
Fig. 2 is a transverse vertical cross-sectional view taken on line 2—2 of Fig. 1 and looking in the direction of the arrows.

In the present embodiment, the journal bearing block 31 is arranged to support a lubricant reservoir 46 which will at all times maintain an adequate supply of lubricant, free from contamination, against the axle journal 18. The said reservoir preferably is formed of some suitable oil resistant flexible material, such as synthetic rubber or plastic, although it is to be understood that the said reservoir may be formed of sheet metal or other non-flexible material. The lubricant reservoir 46 is generally semi-cylindrical in shape, as illustrated in Fig. 2, and includes an integral front wall 47 which is adapted to be secured to the plate 38 in leak-tight engagement. The longitudinal marginal edges of the reservoir 46 are each suitably molded with a sealing lip 48, the said lips being received in longitudinal recesses 37 in the journal bearing 31 and being secured therein in sealing engagement as with bolts 49. The opposite end of the lubricant reservoir 46 is open and is secured to a rigid metal member 51 in the form of a ring which is coextensive with the wall of the reservoir 46 and is secured, in any suitable manner, for example by brazing, to the upper surface of said shoulder 43 of journal bearing 31. As an alternative, the said ring 51 may be molded integrally with the reservoir and removably secured to the said shoulder 43 of the journal bearing block 31, and serves to maintain the same in configuration illustrated in cross section in Fig. 2.

In sealing engagement with the axle journal 18 is a substantially annular seal 52 made of flexible material, preferably oil resistant rubber-like material, which may or may not have resilience, depending upon the kind of material used. In order to facilitate the application of the seal 52 to its applied position without substantial stretching of the material, the seal is overlapped as indicated at 52ª in Fig. 4. The cross-sectional configuration of the seal, when applied, is substantially as illustrated in Fig. 1. The outer edge 53 of the seal is enlarged in the form of a bead and is clamped to the marginal portion 56 of the reservoir 46 and to the upper portion of the ring member 51 by means of a transversely curved clamp ring 57. The outer perimeter of the said ring 51 is preferably formed with a concave surface complementary to the contour of the edge 53 of the seal element so that when the said edge is engaged with the said concaved surface sealing therewith is effected. It will also be observed that the marginal portion 56 of the reservoir is flared outwardly, as illustrated clearly in Fig. 1. Since the said marginal portion 56 of the reservoir ring is reinforced by the ring member 51, it will be seen that sealing engagement between the edge 53 of the seal and the marginal portion of the reservoir may be readily effected. The inner perimeter 58 of the annular seal 52 is shaped in cross section substantially like that illustrated in Fig. 1 and is adapted to engage with the axle journal 18 to provide a highly efficient sealing contact therewith, the contact being such as to prevent the escape of lubricant, but will permit relative rotational movement of the axle journal 18. The desired sealing contact with the journal 18 is insured by forming the portion 58 with an annular recess in which is received a garter spring 59 which serves to maintain the said inner perimeter of the seal in intimate engagement with the axle journal 18. While the lip and garter type of seal is preferred in the assembly herein shown, other types of seals, including the carbon ring and labyrinth types may be used.

It will be apparent from the foregoing description that the axle journal 18, lubricant reservoir 46 and journal bearing block 31 comprise a unitary sealed structure which is contained within a conventional journal box and which is independent of the said journal box so that it may move relative thereto. The said bearing however is adapted to fit closely within the upper portion of the journal box so that lateral movement of the bearing block 31 and the axle journal 18 relative to the side walls of the journal box is substantially eliminated.

When the reservoir is formed of flexible material a stiffener plate 61 is preferably secured to the bottom surface of the reservoir so as to avoid undue distortion thereof.

The plate 38 is provided with an aperture closed by a suitable plug 64, the said aperture providing an opening through which lubricating oil may be introduced into the reservoir 46.

One of the important features of the present invention is that the journal bearing block 31 and lubricant reservoir 46 may be assembled on the axle journal 18 exteriorly of the journal box 10 and the assembled structure may then be introduced through the opening 17 in the journal box to complete the assembly. The use of the present invention does not require any structural modifications in the journal box or in the axle journal itself. However, as a matter of convenience to facilitate emergency repairs, should such repairs be required while a car is in service, the collar 41 of the journal may be removably attached to the journal as by stud bolts 41ª.

When installing my invention, the axle 19 is first withdrawn from its respective journal box according to a well known practice and while so removed the split seal 52 is applied to the axle journal 18, and the garter spring 59 is then applied to the seal 52 in the manner illustrated in Fig. 1. The bearing block 31 and lubricant reservoir 46 may be pre-assembled as a unit and then slipped onto the axle journal 18 by endwise movement. The edge 53 of the seal is then brought into engagement with the ring 51 and edge 56 of the lubricant reservoir and the clamp ring 57 is then applied to maintain the same in tight engagement. The journal reservoir and bearing assembly on the axle is inserted into the journal box through opening 17 in the back wall thereof. The top bearing plate 24 and the rollers are then inserted through the front opening of the journal box and located therein for operation. The insertion of the top bearing plate and rollers to their operative positions above the journal bearing is facilitated by raising the journal box relative to the axle until the said plate and rollers are properly positioned. The reservoir 46 is filled with lubricant through the opening 64 to any desired level so that the lubricant will be in contact with the under side of the axle journal 18. Thus, in the rotation of the axle journal the lubricant is carried to the bearing surface 34 of the journal bearing block 31.

Referring now to Figs. 5 and 6 of the drawings, the top bearing plate designated 24ª is provided with side flanges 24ᵇ at opposite sides of the plate. The rollers designated 28ª are provided with trunnions 28ᵇ—28ᶜ which extend into slots 24ᶜ formed in the pending side flanges of the plate 24ª. The slots 24ᶜ are preferably formed to conform with the configuration of the surfaces 27ª defining the bearing seats for the said rollers 28ª. In order to facilitate insertion of the rollers in space defined by the flanges 24ª, one of the trunnions is in the form of a threaded stud screwed into the correspondingly threaded central bore in one end of the roller. The rollers 28ª will function in the same manner as herein described with reference to rollers 28.

It will be apparent from the foregoing that in operation, the journal bearing block 31 as also the lubricant reservoir 46 will move axially substantially as a unit with the axle journal 18. Thus, there is no relative axial movement between the bearing block 31 and the axle journal 18 such as would cause the axle journal to act in the nature of a piston in a pump system to carry moisture and foreign matter into the lubricant reservoir and onto bearing surfaces, and force oil out of the reservoir through the seal 52. Any movement of the axle transversely of the truck side frames 11, 12 is taken up between the bearing plates 24—24ª and the rollers 28—28ª and is not transmitted to the bearing block 31. It will be seen, because the grooves 27 and 29 have curving inclines, that while lateral movement between the bearing plate 24 or 24ª and bearing block 31 may occur, the particular configuration of the grooves 27 and 29 afford a certain degree of resistance to lateral movement thereby holding the same down to a minimum.

While the invention has been described in terms of certain preferred embodiments which it may assume in practice, it is not intended that the invention be limited to the terms of the embodiment shown nor otherwise than by the terms of the claims here appended.

I claim:

1. In combination with a railway car journal box and an axle journal positioned therein, of means for supporting the journal box on the axle journal with capacity for axial movements of the journal and box relative to each other comprising an assembly removably supported on the axle journal and including a journal bearing block seated on the top portion of the journal and a lubricant reservoir cooperating with said bearing block to provide a sealed enclosure for said axle journal and including an end wall portion secured to an end portion of said bearing block and including means providing sealing engagement with said journal to prevent ingress of foreign matter and loss of lubricant, a bearing plate positioned in the journal box above said bearing block, and rollers interposed between the bearing block and said bearing plate and positioned to roll lengthwise of the journal; the said bearing block being provided with thrust bearing surfaces for engaging portions of the axle journal, whereby the said bearing block and lubricant reservoir are moved axially of the journal box in unison with the axle journal.

2. In combination with a railway car journal box and an axle journal positioned therein, of means for supporting the journal box on the axle journal with capacity for axial movements of the journal and box relative to each other comprising an assembly removably supported on the axle journal and including a journal bearing block seated on the top portion of the journal and a lubricant reservoir cooperating with said bearing block to provide a sealed enclosure for said axle journal and including a flexible end wall portion secured to an end portion of said bearing block and having a portion thereof in sealing engagement with said journal to prevent ingress of foreign matter and loss of lubricant, a bearing plate fixedly mounted in the journal box above said bearing block and rollers interposed between the bearing block and said bearing plate and positioned to roll lengthwise of the journal; the said bearing block being provided with thrust bearing surfaces for engaging portions of the axle journal, whereby the said bearing block and lubricant reservoir are moved axially of the journal box in unison with the axle journal.

3. A combination structure as defined in claim 2 characterized in that one thrust bearing surface of said bearing block is an end wall which extends downwardly in front of the outer end portion of said axle journal.

4. A combination structure as defined in claim 3 characterized in that the axle journal is provided at its outer end with a radially extending flange and in that the said bearing block is provided with a radial recess which fits over said radial flange to provide said thrust bearing surfaces.

References Cited in the file of this patent

UNITED STATES PATENTS

| | | |
|---|---|---|
| 580,498 | Lewis | Aug. 13, 1897 |
| 836,992 | Pulliam | Nov. 27, 1906 |
| 1,118,621 | Barber | Nov. 24, 1914 |
| 1,358,420 | Dallimore | Nov. 9, 1920 |
| 2,438,214 | Horger | Mar. 23, 1948 |